United States Patent
Romirer et al.

(10) Patent No.: US 10,908,058 B2
(45) Date of Patent: Feb. 2, 2021

(54) RHEOMETER WITH A ROTARY RHEOMETER AND A LINEAR DM (T)A ANALYSIS UNIT

(71) Applicant: ANTON PAAR GMBH, Graz-Strassgang (AT)

(72) Inventors: Richard Romirer, Graz (AT); Heimo Kotzian, Graz (AT); Martin Kraker, Graz (AT)

(73) Assignee: Anton Paar GmbH, Graz-Strassgang (AT)

( * ) Notice: Subject to any disclaimer, the term of this patent is extended or adjusted under 35 U.S.C. 154(b) by 150 days.

(21) Appl. No.: 16/289,888

(22) Filed: Mar. 1, 2019

(65) Prior Publication Data
US 2019/0271626 A1 Sep. 5, 2019

(30) Foreign Application Priority Data

Mar. 1, 2018 (AT) ............................. A 50174/2018

(51) Int. Cl.
*G01N 11/14* (2006.01)
*F16C 29/00* (2006.01)
(Continued)

(52) U.S. Cl.
CPC ............ *G01N 11/14* (2013.01); *F16C 29/007* (2013.01); *F16C 29/025* (2013.01);
(Continued)

(58) Field of Classification Search
CPC ......... G01N 11/14; F16C 29/00; F16C 29/02; F16C 32/04
See application file for complete search history.

(56) References Cited

U.S. PATENT DOCUMENTS 5,506,459 A * 4/1996 Ritts ................. F16C 17/08
310/90.5
6,213,737 B1 * 4/2001 Murakami ............ F04D 19/042
310/90.5

(Continued)

FOREIGN PATENT DOCUMENTS

| AT | 515219 B1 | 7/2015 |
| JP | 04258525 A | 9/1992 |
| JP | 2001324436 A | 11/2001 |

OTHER PUBLICATIONS

Zhou Sheng-Qi et al., "Effects of shear rate and temperature on viscosity of alumina polyalphaolefins nanofluids", Journal of Applied Physics, American Institute of Physics, US, vol. 107, No. 5, Mar. 15, 2010 (Mar. 15, 2010), pp. 54317-54317, XP012133625, ISSN: 0021-8979, DOI: 10.1063/1.3309478.

*Primary Examiner* — Harshad R Patel
(74) *Attorney, Agent, or Firm* — Laurence A. Greenberg; Werner H. Stemer; Ralph E. Locher

(57) ABSTRACT

A rheometer has rotary rheometer and a linear DM(T)A analysis unit. A measuring shaft of the rotary rheometer carries a measuring part that faces a measuring part carried on an adjusting rod of the linear analysis unit. The sample under test is placed in a measuring gap between the measuring parts. The DM(T)A analysis unit has a linear motor, in particular magnetically operated, with a stator and a slider, and a magnetically-operated gravitational compensation unit, by way of which it is possible to compensate for the weight force of the adjusting rod, the measuring part on the adjusting rod, the slider, and any optional the components fastened to the slider.

12 Claims, 4 Drawing Sheets

(51) Int. Cl.
*F16C 29/02* (2006.01)
*F16C 32/04* (2006.01)
*G01N 3/32* (2006.01)
*G01N 11/00* (2006.01)

(52) U.S. Cl.
CPC ........... *F16C 32/0423* (2013.01); *G01N 3/32* (2013.01); *G01N 11/00* (2013.01); *G01N 11/142* (2013.01); *F16C 2370/00* (2013.01); *G01N 2011/0066* (2013.01); *G01N 2203/0005* (2013.01); *G01N 2203/0094* (2013.01)

(56) References Cited

U.S. PATENT DOCUMENTS

| | | | |
|---|---|---|---|
| 7,526,941 B2 * | 5/2009 | Doe | G01N 11/14 73/1.02 |
| 8,499,619 B2 * | 8/2013 | Raffer | G01N 11/142 73/54.28 |
| 9,574,983 B2 | 2/2017 | Santner | |
| 2015/0233807 A1 | 8/2015 | Santner | |

* cited by examiner

RHEOMETER WITH A ROTARY RHEOMETER AND A LINEAR DM (T)A ANALYSIS UNIT

CROSS-REFERENCE TO RELATED APPLICATION

This application claims the priority, under 35 U.S.C. § 119, of Austrian patent application A 50174/2018, filed Mar. 1, 2018; the prior application is herewith incorporated by reference in its entirety.

BACKGROUND OF THE INVENTION

Field of the Invention

The present invention relates to a rheometer for obtaining rheometric measurement data. The device has a rotary rheometer having at least units for measuring and/or setting the normal force and/or rotational speed of the measuring part and/or the torque exerted by the measuring shaft or on the measuring shaft and/or the deflection angle of the measuring shaft. The measuring shaft is rotatably mounted in a bearing, preferably an air bearing, preferably at a predetermined height above a base of the rotational rheometer. The rotational rheometer is combined with a linear DM(T)A analysis unit that has an adjusting rod that may be linearly adjusted in a guided manner in a bearing, preferably an air bearing, preferably in a predetermined rotational position, and at least units for measuring the tensile and/or compressive force and/or position and/or feed movement of the adjusting rod. The measuring shaft and the adjusting rod each respectively carry a measuring part that together form a measuring gap. The sample under test, which is preferably viscoelastic, is introduced into the measuring gap between the mutually opposite measuring parts.

Various rheometers are known from the prior art. For example, our commonly assigned U.S. Pat. No. 9,574,983 B2 and its Austrian counterpart application No. AT 515 219 A1 disclose a combination of a rotary rheometer (rotating measuring motor including units for determining torque and optionally normal force) and a linear motor (linear measuring motor) that vertically displaces the lower measuring part in the direction of the rotational axis of the rheometer and defines or measures the displacement path. Both measuring motors contain a force measuring unit or determine the forces from the respective movement and current consumption of the motor.

Rheometers are instruments for determining flow behavior, especially the flow behavior of viscoelastic samples. Methods known in the art for determining flow behavior include, for example, rotational, creep, relaxation and oscillation tests. As a rule, fluid samples are examined in such tests.

Rotary rheometers of this kind are also used to examine solid bodies, for example in oscillation experiments. Investigations of this kind are referred to as dynamic-mechanical analyses.

Dynamic Mechanical Analysis (DMA) is mainly used to determine the viscoelastic properties of plastics and other materials. By applying different stress states, material properties such as the storage modulus and loss modulus (complex modulus) may be determined as a function of temperature, frequency and other dependent variables.

In dynamic mechanical analysis (DMA), also known as dynamic mechanical thermal analysis (DMTA), low sinusoidal mechanical stresses are applied to a test specimen. In the case of purely elastic behavior of a sample, there is no temporal phase shift between the application of force and the response signal. In the case of purely viscous behavior, as it occurs in Newtonian fluids, a phase shift of exactly 90° may be ascertained. In the case of viscoelastic samples, such as plastics, a phase shift, and thus both elastic and viscous properties, may be measured.

Dynamic mechanical analysis may be used to investigate a very broad field of different materials with differing properties. To cover the broadest possible range of properties, a wide variety of loading types are used, such as tension, compression, bending or torsion. In this way, measuring arrangements may be realized, with the limiting force and displacement ranges of the measuring instruments, for materials having low modulus values, as in the case of elastomers, and high modulus values, as in the case of composite materials.

Material specimens with small cross-sections are typically measured under tensile load, in order to achieve sufficient force resolution. Due to the high sensitivity and accuracy of DMTA measurement in torsion, thermoplastics are preferably measured in this mode. Due to the anisotropic properties of composite materials, such materials are almost exclusively analyzed in bending mode. Materials with low modulus values, such as elastomers, are typically measured under pressure or shear.

A combination of a linear measuring motor and a rotary motor, as described in the above-mentioned U.S. Pat. No. 9,574,983 B2 and AT 515 219 A1, enables a multiplicity of different parameters to be measured, in particular simultaneously or in close succession, on the same sample.

The linear DM(T)A analysis unit used in that case is a linear motor with an integrated force measurement unit. The structures are referred to by different names depending on the moving parts of the linear motor. A structure with a fixed coil package is referred to as a moving magnet linear motor; a structure with fixed magnets is referred to as a moving coil linear motor. The moving magnet linear motor has the advantage that the power supply lines for the motor and measuring system do not have to move. In the case of a moving coil motor, the power supply line must necessarily be brought along, incurring maintenance costs and potentially negatively impacting measurement quality.

When moving magnet motors are used as linear motors, the principle of the immersion coil motor is reversed: a magnet is moved inside the stationary coil, enabling a linear feed. This has the advantage on the one hand that it is not necessary to move any electrical supply lines running to the power supply, which could have a negative influence on the sensitive force measurement due to the gravitational and frictional forces of the supply line, and is impossible to avoid in the case of a moving coil motor for contacting the coil; but by the same token, in the case of a moving coil motor, the weight of the moving parts will also increase due to the magnet, which may have a negative effect on measurement quality, because a higher coil current and thus a higher signal noise is necessary in order to overcome the gravitational force of the slider, including the magnet.

When the coil is energized, an electromagnetic field is generated that exerts a force on the slider. The resulting forces are proportional to the electric current (F~I). To deflect the slider in the z-direction (against gravity), the gravitational force FG of the slider must first be overcome. If a user wants to load a sample with a force FP that is significantly smaller than the gravitational force of the motor (FP<<FG), the current required for the force on the sample is also significantly smaller than the current required for overcoming the weight force of the slider ($I_{measurement}$=IG+ IP≈IG). Measurements of force that are based on measuring the current through the coil therefore have a lower limit if IP is so small that as to be within the IG noise band of.

Linear drives with a spring-loaded suspension of the shaft or slider are also known in the art. Because the spring bearings are fixed, only small deflections are possible, because at greater deflections, springs exhibit non-linear behaviors, hysteresis effects or influences when the tilting point of the spring is exceeded, leading to additional measurement inaccuracies.

SUMMARY OF THE INVENTION

It is accordingly an object of the invention to provide a rheometer which overcomes the above-mentioned and other disadvantages of the heretofore-known devices and methods of this general type and which provides for a rheometer that enables measuring force by measuring the coil current, and also enables higher accuracy and fewer errors in the measurement of the force applied to the sample.

With the foregoing and other objects in view there is provided, in accordance with the invention, a rheometer for obtaining rheometric measurement data, the rheometer comprising:

a rotary rheometer having a measuring shaft rotatably mounted in a bearing and a measuring part carried on said measuring shaft, having units for measuring and/or setting a normal force and/or rotational speed of said measuring part and/or a torque exerted by said measuring shaft or on said measuring shaft and/or a deflection angle of said measuring shaft;

a linear DM(T)A analysis unit combined with said rotational rheometer, said linear DM(T)A analysis unit having an adjusting rod disposed to be linearly adjusted in a guided manner in a bearing and carrying a measuring part, and having units for measuring at least one of a tensile force, a compressive force, a position, and a feed movement of said adjusting rod;

said measuring parts respectively carried by said measuring shaft and said adjusting rod being disposed to form a measuring gap therebetween, wherein a sample under test is introduced into the measuring gap between said mutually opposite measuring parts;

said DM(T)A analysis unit having a linear motor with a stator and a slider, and said DM(T)A analysis unit having a magnetic gravitational compensation unit configured to compensate for a weight force of said adjusting rod, said measuring part on said adjusting rod, said slider and optional components fastened to said slider.

In other words, the above and other objects are achieved, according to the invention, in that the DM(T)A analysis unit has a linear motor, in particular one that operates magnetically, having a stator and a slider, the DM(T)A analysis unit having a magnetic gravitational compensation unit by means of which it is possible to compensate for the weight force of the adjusting rod, the measuring part arranged on the adjusting rod, the slider and optionally, the components fastened to the slider.

The arrangement of the gravitational compensation unit achieves a separate compensation for the gravitational force and thus significantly improves the measurement quality by relieving the weight component of the moving slider including magnets. The decisive advantage of the gravitational compensation unit is that samples may be examined with very small forces and/or high measuring resolution without gravity having a noticeable negative effect on the measurement, because gravity and the compensating force cancel each other out, leaving only the force on the sample to be measured.

Particularly advantageous embodiments of the rheometer are defined in greater detail by the characteristics of the dependent claims:

If the gravitational compensation unit has at least one permanent magnet and a ferromagnetic part, an advantageous embodiment of the rheometer according to the invention is as follows:

the permanent magnet is arranged on the adjusting rod and/or the slider of the linear motor and the ferromagnetic part is arranged at the base of the rheometer, or the ferromagnetic part is arranged on the actuating rod and/or the slider of the linear motor and the permanent magnet is arranged on the base of the rheometer, and the ferromagnetic part and permanent magnet are matched to one another in such a way that between the ferromagnetic part and the permanent magnet, a compensating force acts on the slider or adjusting rod opposite the direction of gravity, counteracting the weight force of the adjusting rod, the measuring part arranged on the adjusting rod, and the slider.

In order to advantageously form the magnetic flux and to optimally match the geometry and size of the permanent magnet and the ferromagnetic part to one another, it may be provided that the ferromagnetic part is designed with a tubular or annular shape and the permanent magnet may have a cylindrical shape, the permanent magnet being formed on the slider, in particular around the slider, and arranged inside the tubular ferromagnetic part, or that the ferromagnetic part is formed cylindrically and is arranged on the slider, in particular around the slider, the permanent magnet having a tubular shape and functioning as a stator, and the ferromagnetic part being arranged inside the tubular permanent magnet.

Advantageous materials for the ferromagnetic part are iron or iron-nickel alloys having low magnetic hysteresis.

To provide a particularly compact and lightweight design, it may be provided that the gravitation compensation unit is integrated into the linear motor and/or the linear motor is designed as a moving magnet motor, that the permanent magnet is designed as a magnet of the linear motor, and that the ferromagnetic part is integrated into the stator of the linear motor.

To advantageously focus the magnetic field of the permanent magnet and keep it within the gravitational compensation unit, the permanent magnet may be covered by ferromagnetic elements at each end of the permanent magnet along the direction of movement of the linear motor, forming a magnetic yoke.

A suitable magnetic yoke is achieved by closing off the permanent magnet in the z-direction, i.e. above and below along the A-A axis. The field lines of the permanent magnet in this case form a closed circle within the arrangement and extend only minimally beyond the site of action. This achieves an optimally efficient arrangement and prevents any field components that may escape from the arrangement from interfering with measurement. The magnetic field is therefore chiefly/only active at the point where force is transmitted between the permanent magnet and the ferromagnetic part inside the gravitational compensation unit.

The permanent magnet may advantageously be arranged in a starting position in the center of the ferromagnetic part, so that a minimum magnetic resistance acts in the direction of motion of the linear motor in the starting position. The energy of the magnetic field in the stator reaches a minimum when the magnet is located approximately in the center of the ferromagnetic stator, because the magnetic resistance here is minimal. The magnet therefore experiences a reluctance force (FR) with respect to the center of the stator, so that it is surrounded as uniformly as possible with ferromagnetic material. This causes a centering of the magnet within the stator. If the magnet is deflected, for example by a coil current, it experiences a reluctance force driving it back into the center of the stator.

Other features which are considered as characteristic for the invention are set forth in the appended claims.

Although the invention is illustrated and described herein as embodied in rheometer, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
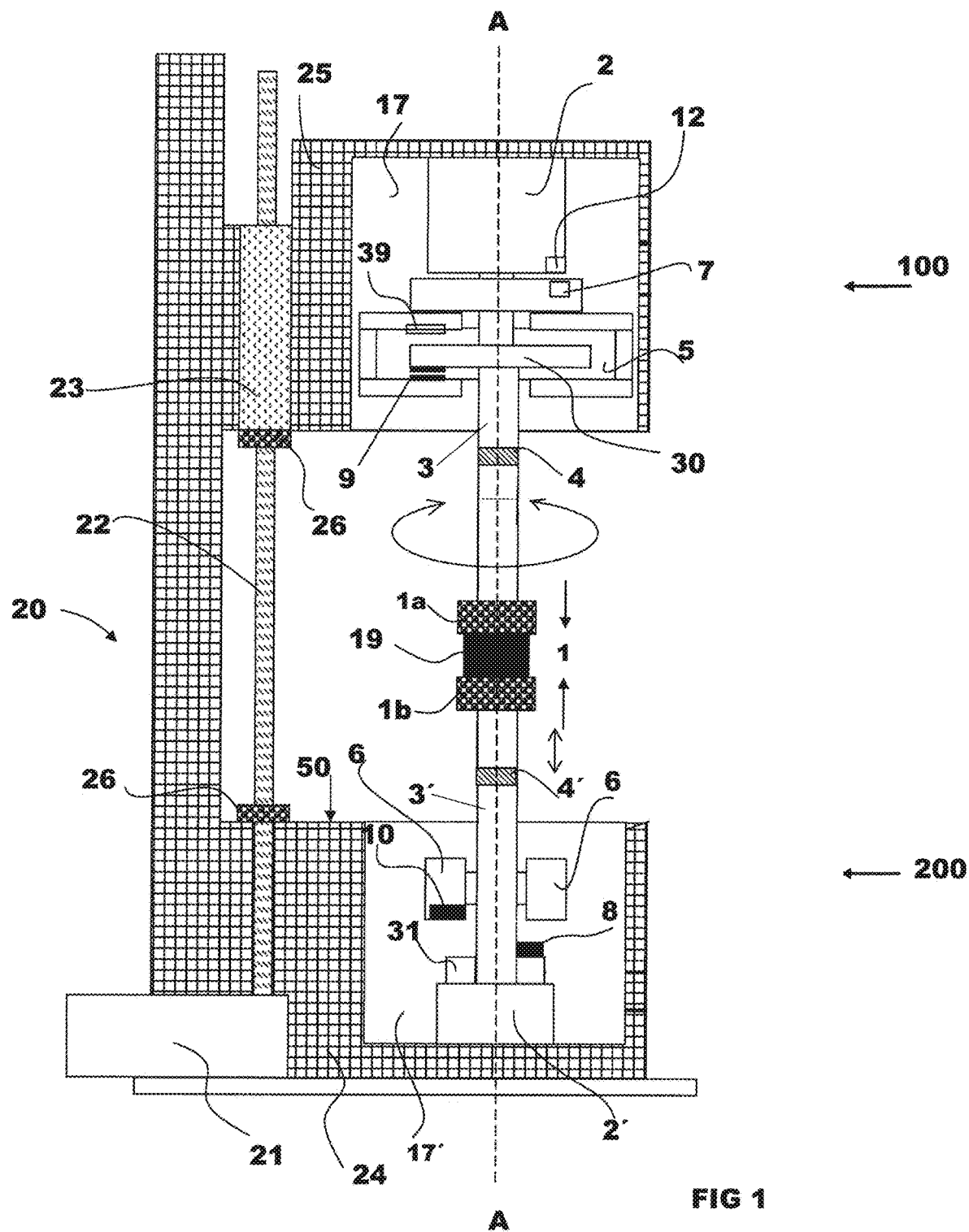
FIG. 1 is a schematic diagram depicting a rheometer according to the invention.

Referring now to the figures of the drawing in detail and first, particularly, to FIG. 1 thereof, there is shown a rheometer with two units, which are preferably modular and thus replaceable, which are mounted on a stand 20 having a frame 24 and a support 25; of these, the upper unit comprises a rotary rheometer 100 and the lower unit comprises a linear DM(T)A analysis unit 200. Alternatively, the linear DM(T)A analysis unit 200 may be arranged at the top and the rotary rheometer 100 may be arranged close to the frame.

The rotary rheometer 100 comprises a support 25 with a measuring motor compartment 17 in which a measuring or drive motor 2 is arranged that drives a measuring shaft 3 mounted in a rotary air bearing 5. The rotary air bearing 5 carries and centers the measuring shaft 3 or a bearing plate 30 connected to that shaft. Alternative kinds of bearings, such as magnetic bearings, may likewise be used. A measuring part 1a may be connected to the measuring shaft 3 via a coupling 4.

The support 25 is height-adjustably mounted on a screw spindle 22 via a positioning part 23. The screw spindle 22 is driven by a positioning motor 21, and a displacement measuring unit 26 may be used to measure the height of the support 25 relative to a base 50 specified on the frame 24 and/or the displacement path of the support 25.

In principle, the height of the support 25 may be adjusted by any pneumatic, hydraulic, piezoelectric or electro-mechanical means, and the height of the support 25 may be determined optically, mechanically or electrically. The measuring motor 2 is designed to determine torques and normal forces acting on the sample under a given load.

The rotary rheometer 100 advantageously has a normal force measuring unit 9 on the measuring shaft 3 and/or bearing plate 30, and/or inside the bearing 5, permitting determination of forces exerted on the measuring shaft 3 in the direction of the AA axis of the rheometer 100. This normal force measuring unit 9 may also be designed to exert forces in the direction of the AA axis on the bearing plate 30 and/or the measuring shaft 3. Alternatively or in addition to the normal force measuring unit 9, a height measuring unit 39 may be provided as a sensor for sensing the height position or height change of the measuring shaft 3 and/or bearing plate 30. By means of the force measuring unit 9 and/or height measuring unit 39, adjustment units that are present may be controlled and used to counteract the forces exerted on the measuring shaft 3 in the direction of the AA axis and to keep the height of the measuring part 1a invariant. Such adjustment units may function mechanically, pneumatically, hydraulically, electrically, piezoelectrically or electromechanically. Such an adjustment unit can, for example, be integrated into the normal force measuring unit 9 or is available in the form of the actuator motor 21 driving the screw spindle 22, which receives control signals from the height measuring unit 39.

The drive or measuring motor 2 has a torque detector 12 that makes it possible to ascertain the torque exerted by or on the motor. Alternatively, the torque may also be ascertained from the current consumption of the measuring motor 2. In addition, an angle encoder 7 is provided for the measuring shaft 3, by means of which the angle of rotation of the measuring shaft 3 may be ascertained or a rotation of the measuring shaft 3 may be determined. Torque and/or angle of rotation and/or occurring normal force are the principal measurement values determined in the rotational rheometer 100.

The rheometer has a gravitational compensation unit 60, not shown in FIG. 1, with which the weight force of the adjusting rod 3', the measuring part 1b arranged on the adjusting rod 3' and the slider 62 of the linear motor 2' may be compensated.

A measuring part 1b, positioned opposite the measuring part 1a, is supported by a linearly movable adjusting rod 3' of the linear DM(T)A analysis unit 200 opposite the rotational rheometer 100. Measuring parts 1a and 1b limit the gap 1 in which the sample to be tested 19 is arranged. Measuring part 1b may be replaceably connected with the linear motor 2' via a coupling 4'. The linear motor 2' moves the adjusting rod 3', which is mounted in an air bearing 6, in the direction of rheometer axis AA. A position encoder 8 is assigned to the adjusting rod 3' to measure the adjustment travel. The compressive or tensile forces exerted by the actuator rod 3' may be measured using the normal force measuring unit 9 of the rheometer motor 100 or the force measuring units of the DM(T)A analysis unit 200. The linear or variable displacement motor 2' is preferably designed as a measuring motor, and the tensile or compressive force acting on the sample 19 may be ascertained from the current consumption of the linear motor 2'. An angle encoder 10 may be provided to determine any rotation of the 3' control rod about the AA axis, which controls a rotary unit 31 to rotate the 3' control rod. Alternatively, the control rod 3' may be prevented from rotating about the rheometer axis AA, either by suitably-placed additional bearings, e.g. air bearings acting on a transverse beam running through the control rod 3', or by a suitable geometry of the control rod 3' within the bearing, in particular by the control rod 3' having a square cross-section.

The rheometer has a gravitational compensation unit 60, not shown in FIG. 1, by means of which it is possible to compensate for the weight force of the adjusting rod 3', the measuring part 1b arranged on the adjusting rod 3' and the slider 62 of the linear motor 2'.

Figure 2:
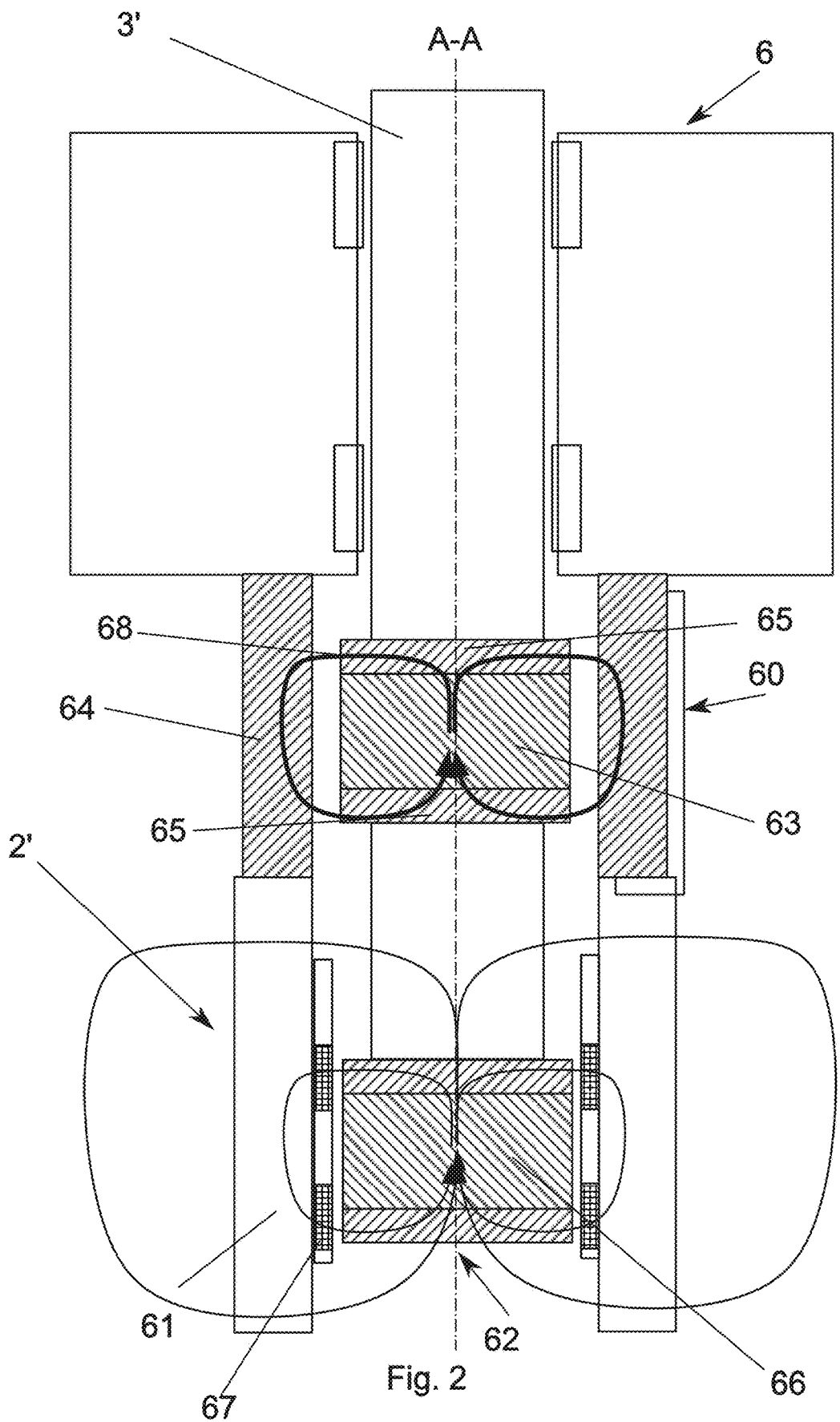
FIG. 2 is a schematic view of a design with gravitational compensation unit and moving magnet motor.

FIG. 2 shows a schematic detail view of one embodiment of the DM(T)A 200 analysis unit. The DM(T)A analysis unit 200 has a magnetic linear motor 2', and the linear motor 2' is designed as a moving magnet motor that has a stator 61 and slider 62. The slider 62 denotes the sum of the parts moving in the direction of the A-A axis of the rheometer inside the DM(T)A analysis unit 200, and in particular the actuator rod 3' and magnetic units. The coil 67 of the linear motor 2' is arranged on the stator 61. When energized, it moves a magnet 66 attached to the slider 62 in the direction of the A-A axis of the rheometer or the adjusting rod 3'. Between the linear motor 2' and the air bearing 6, there is a magnetic gravitational compensation unit 60. The gravitational compensation unit 60 comprises a permanent magnet 63 arranged on the slider 62 or the control rod 3', which is cylindrical and arranged around the control rod 3' or the slider 62. The gravitational compensation unit 60 further comprises a tubular ferromagnetic part 64 connected to the base 50 of the rheometer via the stator 61 of the linear motor 2'. The adjusting rod 3' or slider 62 are passed through the tubular ferromagnetic part 64, and in a starting position, the permanent magnet 63 is arranged centered in relation to the A-A axis. The ferromagnetic part 64 and the permanent magnet 63 are matched to each other, so that between the ferromagnetic part 64 and the permanent magnet 63 a compensating force in the direction of the axis A-A acts against the direction of gravity on the slider 62 and the adjusting rod 3' respectively. The compensating force counteracts the weight of the actuator rod 3', the measuring part 1b arranged on the actuator rod 3' and the slider 62, as well as the magnet 63, the magnet 66, the ferromagnetic elements 65 and the clutch 4'. The permanent magnet 63 with the ferromagnetic part 64 holds the entire arrangement, i.e. actuator rod 3', slider 62 and measuring part 1b, while the coil 67 of the linear motor 2' deflects the actuator rod 3' or slider 62 by modifying the magnetic field. This means that only small coil currents are required in order to apply force to a sample 19.

The energy of the magnetic field 68 of the gravitational compensation unit 60 reaches a minimum when the permanent magnet 63 is located approximately in the center of the ferromagnetic part 64, because the magnetic resistance is minimal at that point. The permanent magnet 63 accordingly undergoes a reluctance force (FR) with respect to the center of the ferromagnetic part 64, so as to be surrounded as uniformly as possible with ferromagnetic material. This causes the permanent magnet 63 to be centered within the ferromagnetic part 64. If the permanent magnet 63 is deflected, for example by a coil current, it encounters a reluctance force that pushes it back to the center of the ferromagnetic part 64. The strength of this reluctance force depends on geometry and position. The geometry of the ferromagnetic part 64 and the permanent magnet may be selected in such a way that the reluctance force has the same magnitude, but the opposite sign, as the gravitational force of the slider 62 including the magnet, adjusting rod 3' and measuring part 1b and, if applicable, the coupling. This causes the reluctance force and weight force to cancel each other out, and the slider 62 floats between them. With suitable geometry, the system has a stable equilibrium and the slider 62 returns to its float position automatically after deflection, due to the location-dependent reluctance force. The slider positions itself the in z-direction, i.e. in the direction of the A-A axis, independently without applying a coil current. Depending on the geometry and materials and their coordination, the slider 62 may have either strong or weak positioning. Unstable equilibria of the system, in which there is a float position, but the slider does not automatically return to its original position, are also suitable for precise measurements, because in the vicinity of the floating position only very low currents are needed to keep the slider in position. The advantage of the gravitational compensation unit 60 is that very small forces may be used to investigate samples 19, without gravity influencing the measurement.

Figure 3:
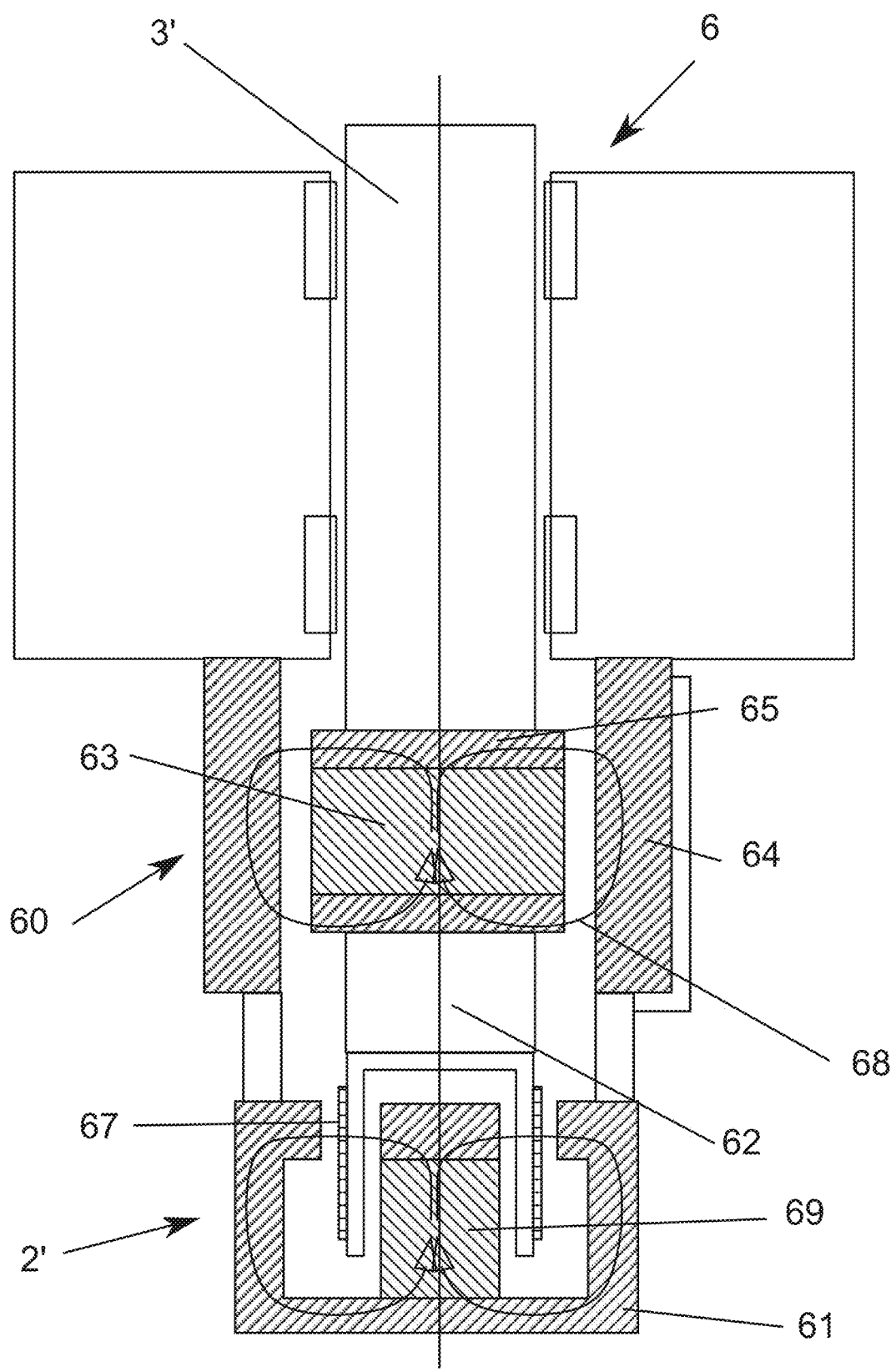
FIG. 3 shows an embodiment with a moving coil motor and gravitational compensation unit.

FIG. 3 shows a detail view of another embodiment of the rheometer according to the invention. The linear motor 2' is designed as a moving coil motor or immersion coil motor. The gravitational compensation unit 60 is arranged between the linear motor 2' and the bearing 6. The gravitational compensation unit 60 is the same as in FIG. 2. The gravitational compensation unit 60 comprises a permanent magnet 63 arranged on the slider 62 or control rod 3'; the permanent magnet is cylindrical and is arranged around the control rod 3' or slider 62. The gravitational compensation unit 60 also comprises a ferromagnetic part 64 which is tubular and connected to the base 50 of the rheometer via the stator 61 of the linear motor 2'. The adjusting rod 3' or slider 62 are guided through the tubular ferromagnetic part 64 and the permanent magnet 63 is arranged in the middle of the ferromagnetic part 64 with respect to the A-A axis. The adjusting rod 3' or slider 62 are guided through the tubular ferromagnetic part 64; the permanent magnet 63 is arranged in the center of the ferromagnetic part 64 with respect to the A-A axis. The linear motor 2' is designed as a immersion coil motor and has a coil 67 connected to the slider 62. The stator 61 of the immersion coil motor comprises a motor permanent magnet 69 which, for example, sits cylindrically in the center of stator 61. In an alternative design, the motor permanent magnet 69 may also be mounted at another position in the stator 61, for example in the form of a ring in the outer area of the stator 61.

Figure 4:
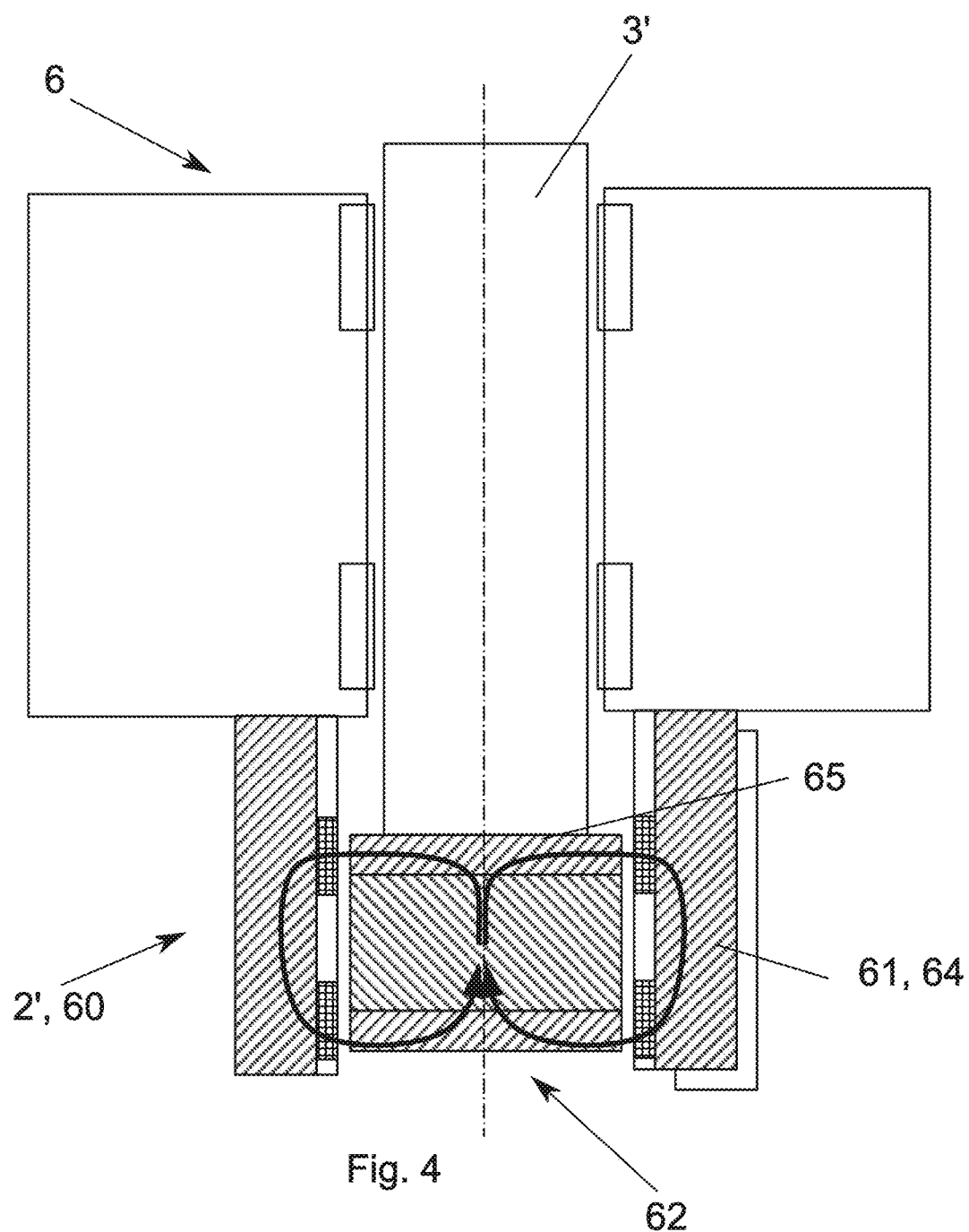
FIG. 4 shows a design with a gravitational compensation unit integrated into the linear motor.

FIG. 4 shows a schematic view of another embodiment of the rheometer according to the invention. The linear motor 2' is designed as a moving magnet motor. In this embodiment, the gravitational compensation unit 60 is integrated into the linear motor 2'. The permanent magnet 63 is designed as a magnet of the linear motor 2' or integrated into the linear motor and is arranged on the slider 62. The ferromagnetic part 64 is integrated in the stator 61 of the linear motor 2' or the stator 61 is designed as a ferromagnetic part 64. By integrating the gravitational compensation unit 60 into the linear motor 2', a particularly compact design may be achieved, so that the added weight of the externally-mounted permanent magnet 64 may be dispensed with and the installation space may be greatly reduced.

Alternatively to the designs in FIGS. 2 and 3, it may be provided that the ferromagnetic part 64 is arranged on or connected to the adjusting rod 3' and/or slider 62 of the linear motor 2' and that the permanent magnet 63 is arranged as a ring magnet in the stator 61 or at the base 50 of the rheometer, or is connected to the base.

Optionally, as shown in FIGS. 2 to 4, the permanent magnet 63 may be covered by ferromagnetic elements 65 at the respective ends of the permanent magnet 63 along the movement direction of the linear motor 2' or slider 62, i.e. in the direction of the A-a axis, forming a magnetic yoke.

In the embodiments according to the invention, the ferromagnetic part 64 and/or ferromagnetic elements 65 advantageously consist of iron or an iron-nickel alloy with low magnetic hysteresis.

The invention claimed is:

1. A rheometer for obtaining rheometric measurement data, the rheometer comprising:
   a rotary rheometer having a measuring shaft rotatably mounted in a bearing and a measuring part carried on said measuring shaft, having units for measuring and/or setting a normal force and/or rotational speed of said measuring part and/or a torque exerted by said measuring shaft or on said measuring shaft and/or a deflection angle of said measuring shaft;
   a linear DM(T)A analysis unit combined with said rotational rheometer, said linear DM(T)A analysis unit having an adjusting rod disposed to be linearly adjusted in a guided manner in a bearing and carrying a measuring part, and having units for measuring at least one of a tensile force, a compressive force, a position, and a feed movement of said adjusting rod;
   said measuring parts respectively carried by said measuring shaft and said adjusting rod being disposed to form a measuring gap therebetween, wherein a sample under test is introduced into the measuring gap between said mutually opposite measuring parts;
   said DM(T)A analysis unit having a linear motor with a stator and a slider, and said DM(T)A analysis unit having a magnetic gravitational compensation unit configured to compensate for a weight force of said adjusting rod, said measuring part on said adjusting rod, said slider and optional components fastened to said slider.

2. The rheometer according to claim 1, wherein:
   said measuring shaft is rotatably mounted in an air bearing at a predetermined height above a base of said rotational rheometer;
   said adjusting rod is guided in an air bearing in a predetermined rotational position; and
   said linear motor of said DM(T)A analysis unit is a magnetic linear motor.

3. The rheometer according to claim 1, wherein said gravitational compensation unit comprises at least a permanent magnet and a ferromagnetic part, and wherein:
   said permanent magnet is arranged on said adjusting rod and/or slider of said linear motor, and said ferromagnetic part is arranged on a base of the rheometer; or
   said ferromagnetic part is arranged on said adjusting rod and/or said slider of said linear motor, and said permanent magnet is arranged on said base of the rheometer; and
   said ferromagnetic part and said permanent magnet are matched to one another in such a way that, a compensating force between said ferromagnetic part and said permanent magnet acts against the direction of gravity on said slider or said adjusting rod, and the compensating force counteracts a combined weight of said adjusting rod, said measuring part arranged on said adjusting rod, and said slider.

4. The rheometer according to claim 1, wherein said ferromagnetic part is a tube and said permanent magnet has a cylindrical or annular shape, and wherein said permanent magnet is arranged inside said tubular ferromagnetic part on said slider.

5. The rheometer according to claim 4, wherein said permanent magnet is disposed around said slider.

6. The rheometer according to claim 1, wherein said ferromagnetic part is cylindrical and is arranged on said slider, said permanent magnet is a tubular permanent magnet and configured to function as a stator, and wherein said ferromagnetic part is arranged inside said tubular permanent magnet.

7. The rheometer according to claim 1, wherein said linear motor is a device selected from the group consisting of a moving magnet motor, a moving coil motor, or an immersion coil motor.

8. The rheometer according to claim 1, wherein said gravitational compensation unit is integrated into said linear motor.

9. The rheometer according to claim 8, wherein said linear motor is a moving magnet motor, said permanent magnet is a magnet of said linear motor and said ferromagnetic part is integrated into said stator of said linear motor.

10. The rheometer according to claim 1, wherein said ferromagnetic part consists of iron or an alloy of iron-nickel having low magnetic hysteresis.

11. The rheometer according to claim 1, wherein said permanent magnet is covered by ferromagnetic elements on respective ends of said permanent magnet along a direction of movement of said linear motor, and configured to form a magnetic yoke.

12. The rheometer according to claim 1, wherein said permanent magnet, in a starting position, is disposed in a center of said ferromagnetic part, so that a magnetic resistance in a direction of movement of said linear motor in the starting position is at a minimum.

* * * * *